United States Patent
Zhu et al.

(10) Patent No.: US 11,861,775 B2
(45) Date of Patent: Jan. 2, 2024

(54) PICTURE RENDERING METHOD, APPARATUS, ELECTRONIC DEVICE, AND STORAGE MEDIUM

(71) Applicant: Huawei Technologies Co., Ltd., Shenzhen (CN)

(72) Inventors: Huanhuan Zhu, Shanghai (CN); Wei Tan, Helsinki (FI); Sanshan Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 17/769,226

(22) PCT Filed: Oct. 9, 2020

(86) PCT No.: PCT/CN2020/120003
§ 371 (c)(1),
(2) Date: Apr. 14, 2022

(87) PCT Pub. No.: WO2021/073448
PCT Pub. Date: Apr. 22, 2021

(65) Prior Publication Data
US 2023/0113571 A1    Apr. 13, 2023

(30) Foreign Application Priority Data
Oct. 17, 2019    (CN) .......................... 201910988870.7

(51) Int. Cl.
*G06T 19/00*    (2011.01)
*G06T 13/20*    (2011.01)
(Continued)

(52) U.S. Cl.
CPC .............. *G06T 13/20* (2013.01); *A63F 13/52* (2014.09); *G06T 7/70* (2017.01); *G06T 7/97* (2017.01); *G06T 15/50* (2013.01)

(58) Field of Classification Search
CPC .. G06T 13/20; G06T 7/70; G06T 7/97; G06T 15/50; A63F 13/52
See application file for complete search history.

(56) References Cited

U.S. PATENT DOCUMENTS 10,545,497 B1 *    1/2020   Cui ....................... G05D 1/0016
2004/0066460 A1 *    4/2004   Kondo ................... G06T 7/254
                                                         348/222.1
(Continued)

FOREIGN PATENT DOCUMENTS

CN          104740873 A      7/2015
CN          105184847 A      12/2015
(Continued)

OTHER PUBLICATIONS

Shade, J., Lischinski, D., Salesin, D. H., DeRose, T., & Snyder, J. (Aug. 1996). Hierarchical image caching for accelerated walk-throughs of complex environments. In Proceedings of the 23rd annual conference on Computer graphics and interactive techniques (pp. 75-82).*

*Primary Examiner* — Sarah Lhymn
(74) *Attorney, Agent, or Firm* — Conley Rose, P.C.

(57) ABSTRACT

A picture rendering method includes obtaining first picture data of a current frame; comparing the first picture data with currently recorded second picture data of a previous frame to determine a first part in the first picture data that does not change with respect to the second picture data and a second part in the first picture data that changes with respect to the second picture data; and rendering the second part in the current frame, including reusing a rendering result of the first part in the previous frame to obtain and display a rendering result of the current frame.

20 Claims, 8 Drawing Sheets

(51) Int. Cl.
*A63F 13/52* (2014.01)
*G06T 7/00* (2017.01)
*G06T 7/70* (2017.01)
*G06T 15/50* (2011.01)

(56) References Cited

U.S. PATENT DOCUMENTS

| | | |
|---|---|---|
| 2011/0102446 A1 | 5/2011 | Oterhals et al. |
| 2012/0176364 A1 | 7/2012 | Schardt et al. |
| 2012/0176386 A1 | 7/2012 | Hutchins |
| 2015/0091892 A1 | 4/2015 | Kwon et al. |
| 2015/0221122 A1 | 8/2015 | Son et al. |
| 2015/0287233 A1 | 10/2015 | Shin et al. |
| 2016/0026895 A1* | 1/2016 | Huffman ............ A01K 29/005 382/110 |
| 2016/0277677 A1* | 9/2016 | Yamada ............ H04N 23/951 |
| 2017/0116750 A1* | 4/2017 | Pond ............ G06T 7/168 |
| 2017/0188090 A1* | 6/2017 | Yabu ............ H04N 21/23418 |
| 2018/0341813 A1* | 11/2018 | Chen ............ G06V 20/46 |
| 2018/0342070 A1* | 11/2018 | Chen ............ G06V 20/52 |
| 2019/0370551 A1* | 12/2019 | Mao ............ G06V 20/52 |
| 2020/0184658 A1* | 6/2020 | Cui ............ G06V 20/10 |

FOREIGN PATENT DOCUMENTS

| | | |
|---|---|---|
| CN | 105701852 A | 6/2016 |
| CN | 106815880 A | 6/2017 |
| CN | 107203960 A | 9/2017 |
| CN | 107273080 A | 10/2017 |
| CN | 107507262 A | 12/2017 |
| CN | 108389245 A | 8/2018 |
| CN | 108765531 A | 11/2018 |
| CN | 109621413 A | 4/2019 |
| CN | 109685885 A | 4/2019 |
| CN | 106127843 B | 5/2019 |

\* cited by examiner

PICTURE RENDERING METHOD, APPARATUS, ELECTRONIC DEVICE, AND STORAGE MEDIUM

CROSS-REFERENCE TO RELATED APPLICATIONS

This is a U.S. National Stage of International Patent Application No. PCT/CN2020/120003 filed on Oct. 9, 2020, which claims priority to Chinese Patent Application No. 201910988870.7 filed on Oct. 17, 2019. Both of the aforementioned applications are hereby incorporated by reference in their entireties.

TECHNICAL FIELD

Embodiments of this application relate to the field of picture rendering technologies, and in particular, to a picture rendering method, an apparatus, an electronic device, and a storage medium.

BACKGROUND

Currently, due to the fact that a user has an increasingly high requirement on a picture display effect, a hardware capability of an electronic device is continuously improved, and so on, increasing excellent special effects and rendering effects are added to a basic picture effect. However, in a related technology, for picture rendering, all objects in each frame usually need to be rendered. As there are increasing increasingly complex rendering effects, the electronic device bears a relatively heavy rendering load. Consequently, there are often problems, for example, frame freezing occurs, picture smoothness is reduced, and the electronic device generates heat and consumes power quickly.

SUMMARY

Embodiments of this application provide a picture rendering method, an apparatus, an electronic device, and a storage medium, to reduce a picture rendering load.

According to a first aspect, an embodiment of this application provides a picture rendering method. The method includes: obtaining first picture data of a current frame; comparing the first picture data with currently recorded second picture data of a previous frame, to determine a first part that is in the first picture data and that does not change with respect to the second picture data and a second part that is in the first picture data and that changes with respect to the second picture data; and reusing a rendering result of the first part in the previous frame, and rendering the second part in the current frame, to obtain and display a rendering result of the current frame.

A rendering effect of a part that is in the previous frame and that does not change with respect to the current frame is reused, so that repeated rendering of the part that does not change in a picture can be avoided, to reduce a picture rendering load, reduce processing resources occupied for picture rendering, improve stability of a rendering frame rate, enhance picture smoothness, and reduce energy consumption.

In a feasible implementation, each of the first picture data and the second picture data includes a visual range of a picture background and virtual space positions and statuses of a static object and a light source in the picture. The following method may be performed to perform an operation of comparing the first picture data with the second picture data of the previous frame: comparing a first visual range described in the first picture data with a second visual range described in the second picture data, to determine an overlapping region between the first visual range and the second visual range; comparing virtual space positions and statuses that are of a static object located in the overlapping region and that are in the first picture data and the second picture data; and comparing virtual space positions and statuses that are of the light source and that are described in the first picture data and the second picture data.

In an implementation, if the overlapping region between the first visual range and the second visual range is less than a preset range, a visual range of the current frame may be further expanded on the basis of the first visual range, and a part obtained after expansion is rendered. The first visual range is expanded, so that it can be ensured that when a moving object in the picture moves in a small range, a visual range of a next frame of picture can be included in an expanded visual range of the current frame, or when a moving object moves in a relatively large range, there can be a relatively large overlapping region between a next frame of picture and the current frame of picture, to help use the rendering result of the current frame to a larger extent and reduce a rendering load.

An operation of expanding the visual range of the current frame may be performed based on any one of the following relationships:

First relationship: An expansion amount of the visual range of the current frame is directly proportional to a size of the first part that does not change.

Second relationship: An expansion amount of the visual range of the current frame is inversely proportional to a size of the second part that changes.

In the first relationship, a larger size of the part that does not change indicates a larger quantity of rendering effects, in the previous frame, that can be reused and a lighter rendering load of an electronic device. In this case, more processing resources may be allocated for expansion to a relatively large range, so that it can be implemented as much as possible that there is a relatively large overlapping region between the next frame and the current frame, to reuse more rendering results, reduce the rendering load, and improve rendering efficiency. In the second relationship, a larger size of the second part that changes indicates a larger quantity of processing resources required for rendering. In this case, there may be insufficient processing resources for expanding the visual range of the current frame. Therefore, the range needs to be expanded to a small extent.

The overlapping region between the first visual range of the current picture and the second visual range of the previous frame of picture is determined, and parts that are in the first picture data and the second picture data and that are used to describe the overlapping region are compared. Therefore, a case in which all of the first picture data is compared with all of the second picture data can be avoided while comparison accuracy is ensured. In this way, a calculation amount of data comparison is reduced, and data comparison efficiency is improved.

In a feasible implementation, the method in the first aspect of embodiments of this application may further include: updating the first visual range described in the first picture data to the expanded visual range of the current frame.

In a feasible implementation, the method in the first aspect of embodiments of this application may further include: updating the currently recorded second picture data of the previous frame to the first picture data of the current frame.

Pictures presented in two adjacent frames are usually closest. Therefore, after the second picture data is updated to the first picture data, it can be implemented that for picture rendering of the next frame, a maximum quantity of effects can be obtained for reuse from the first picture data that is closest to the next frame in time. In this way, the rendering load is reduced, and rendering efficiency is improved.

According to a second aspect, an embodiment of this application provides a picture processing apparatus, including:
an obtaining module, configured to obtain first picture data of a current frame;
a comparison module, configured to compare the first picture data with currently recorded second picture data of a previous frame of the current frame, to determine a first part that is in the first picture data and that does not change with respect to the second picture data and a second part that is in the first picture data and that changes with respect to the second picture data; and
a rendering module, configured to: reuse a rendering result corresponding to the first part in the previous frame, and render the second part in the current frame, to obtain and display a rendering result of the current frame.

In a feasible implementation, each of the first picture data and the second picture data includes a visual range of a picture background and virtual space positions and statuses of a static object and a light source.

In a feasible implementation, the comparison module includes:
a first comparison submodule, configured to compare a first visual range described in the first picture data with a second visual range described in the second picture data, to determine an overlapping region between the first visual range and the second visual range; and
a second comparison submodule, configured to compare virtual space positions and statuses that are of a static object located in the overlapping region and that are in the first picture data and the second picture data; and a third comparison submodule, configured to compare virtual space positions and statuses that are of the light source and that are described in the first picture data and the second picture data.

In a feasible implementation, the picture processing apparatus further includes a processing module, configured to: when a range of the overlapping region is less than a preset range, expand a visual range of the current frame on the basis of the first visual range, and render a part obtained after expansion.

An operation of expanding the visual range of the current frame may be performed based on any one of the following relationships:

First relationship: An expansion amount of the visual range of the current frame is directly proportional to a size of the first part that does not change.

Second relationship: An expansion amount of the visual range of the current frame is inversely proportional to a size of the second part that changes.

In a feasible implementation, the picture processing apparatus further includes:
a first updating module, configured to update the second visual range described in the second picture data to an expanded visual range of the current frame.

In a feasible implementation, the picture processing apparatus further includes:

a second updating module, configured to update the currently recorded second picture data of the previous frame to the first picture data of the current frame.

According to a third aspect, an embodiment of this application provides an electronic device, an interface, and a processor. The interface is coupled to the processor. The processor is configured to perform the method in the first aspect.

According to a fourth aspect, an embodiment of this application provides a computer-readable storage medium. The computer-readable storage medium stores a computer program.

When the computer program is run on a computer, the computer is enabled to perform the method in the first aspect.

DESCRIPTION OF EMBODIMENTS

Terms used in embodiments of this application are merely used to explain specific embodiments of this application, but are not intended to limit this application.

Figure 1:
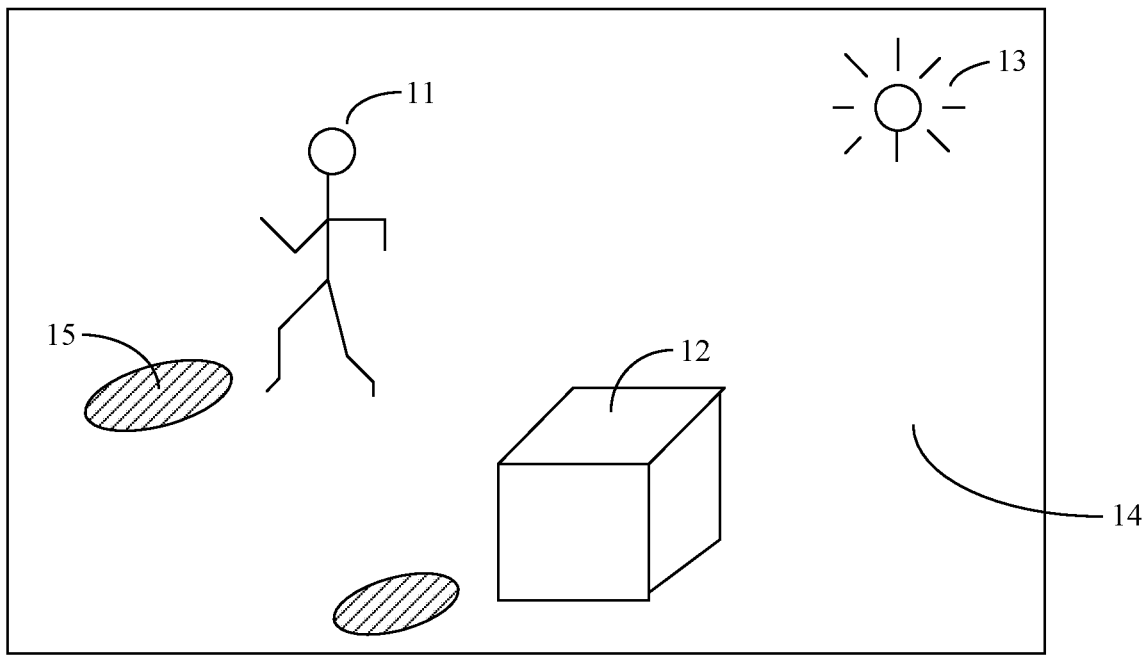
FIG. 1 is a schematic diagram of a rendered picture according to an embodiment of this application.

FIG. 1 is a schematic diagram of a rendered picture according to an embodiment of this application. For example, the picture may be understood as a 3D game picture or a 3D animation picture with a fixed field of view. The picture includes the following several parts: a moving object 11, a static object 12, a light source 13, a background 14, and a related effect (for example, a shadow 15 generated when the light source illuminates an object) generated by the light source. In a related technology, during rendering of the picture, all parts included in the picture usually need to be re-rendered. Consequently, there is a relatively heavy rendering load for the picture, and there are often problems such as freezing, low picture smoothness, quick power consumption, and heat generation. However, actually, two adjacent frames of pictures usually include a same part. For example, the light source usually does not change in a short time, and a position and a status of the light source in virtual three-dimensional space presented in the picture usually do not change in the two adjacent frames of pictures. For another example, the static object in the picture does not move or change, and therefore a status of the static object and a position of the static object in virtual three-dimensional space do not change in the two adjacent frames of pictures. Therefore, if the parts that do not change are repeatedly rendered in the two adjacent frames of pictures, a rendering resource is actually wasted, and a rendering load is increased. For this case, embodiments of this application provide a picture rendering solution. In this solution, a rendering effect of a part that is in a previous frame and that does not change with respect to a current frame is reused, and on the basis of the rendering effect of the part, incremental rendering is performed on a part that changes, to reduce a rendering load.

Figure 2:
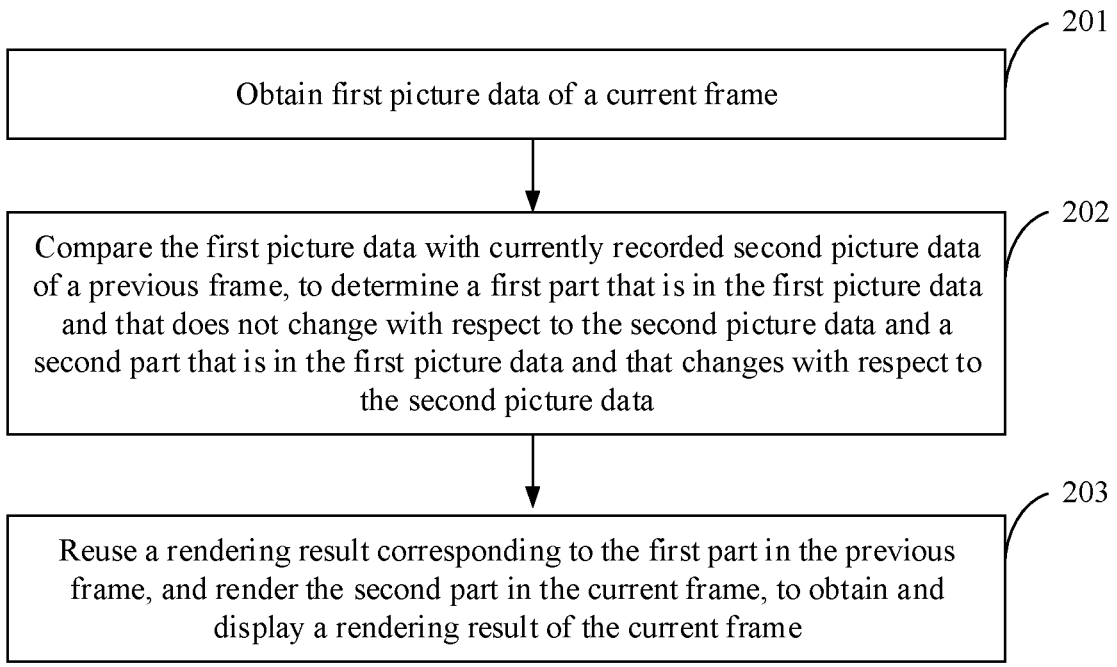
FIG. 2 is a flowchart of a picture rendering method according to an embodiment of this application.

For example, FIG. 2 is a flowchart of a picture rendering method according to an embodiment of this application. As shown in FIG. 2, the method includes the following steps.

Step 201: Obtain first picture data of a current frame.

Step 202: Compare the first picture data with currently recorded second picture data of a previous frame, to determine a first part that is in the first picture data and that does not change with respect to the second picture data and a second part that is in the first picture data and that changes with respect to the second picture data.

Step 203: Reuse a rendering result corresponding to the first part in the previous frame, and render the second part in the current frame, to obtain and display a rendering result of the current frame.

For example, a picture in this embodiment may be understood as a 3D game picture or a 3D animation picture with a fixed field of view, and content of the picture may be divided, for example, into four parts: a picture background, a static object, a moving object, and a light source. For example, the picture background part may include information such as a visual range of the picture background, and the parts such as the static object, the moving object, and the light source may include position information and a status of the object in virtual space. For the static object and the moving object, the status in this embodiment may be used to describe a static state or a moving state of the object. For the light source, the status in this embodiment may be used to represent information such as an illumination angle and illumination intensity of the light source.

In this embodiment, data of any frame of picture includes data of all of the four parts of the picture.

In this embodiment, the current frame of picture may be understood as a picture to be rendered, and the previous frame of picture of the current frame may be understood as a picture for which rendering is completed.

In this embodiment, after each frame of picture is rendered, a rendering result of each frame of picture is stored in a preset buffer for reuse in a next frame. For example, in an $N^{th}$ frame, all of four parts of a picture are re-rendered by using a related technology, and after rendering of the $N^{th}$ frame is completed, a rendering result of the $N^{th}$ frame is stored in the preset buffer (for example, a texture buffer, Texture Buffer). During rendering of an $(N+1)^{th}$ frame, the rendering result of the $N^{th}$ frame may be obtained from the preset buffer, to reuse the rendering result of the $N^{th}$ frame in the $(N+1)^{th}$ frame. In addition, after rendering of the $(N+1)^{th}$ frame is completed, a rendering result of the $(N+1)^{th}$ frame is added to the preset buffer, so that the rendering result of the $(N+1)^{th}$ frame can be reused in a next frame of the $(N+1)^{th}$ frame. Alternatively, in some implementations, to save storage space of the preset buffer, the rendering result, of the $N^{th}$ frame, stored in the preset buffer may be replaced with the rendering result of the $(N+1)^{th}$ frame. In this way, the preset buffer always stores a rendering result of a latest to-be-rendered picture. There are usually more same parts between the current frame and the previous frame, and therefore a rendering result of the previous frame can be reused to the greatest extent in the current frame.

During comparison of the first picture data of the current frame with the second picture data of the previous frame, corresponding parts in the first picture data and the second picture data may be compared. For example, a first visual range described in the first picture data is compared with a second visual range described in the second picture data, to determine whether a virtual space position and a size of the first visual range changes with respect to the second visual range; data that is used to describe a same static object and that is in the first picture data and the second picture data is compared, to determine whether a virtual space position and a status of the static object change, for example, whether the static object changes from the static state to the moving state and whether a structure/shape changes; and data that is used to describe the light source and that is in the first picture data and the second picture data is compared, to determine whether a virtual space position (for example, a height and an orientation) and a status (for example, an illumination angle and illumination intensity) of the light source change.

Figure 3A:
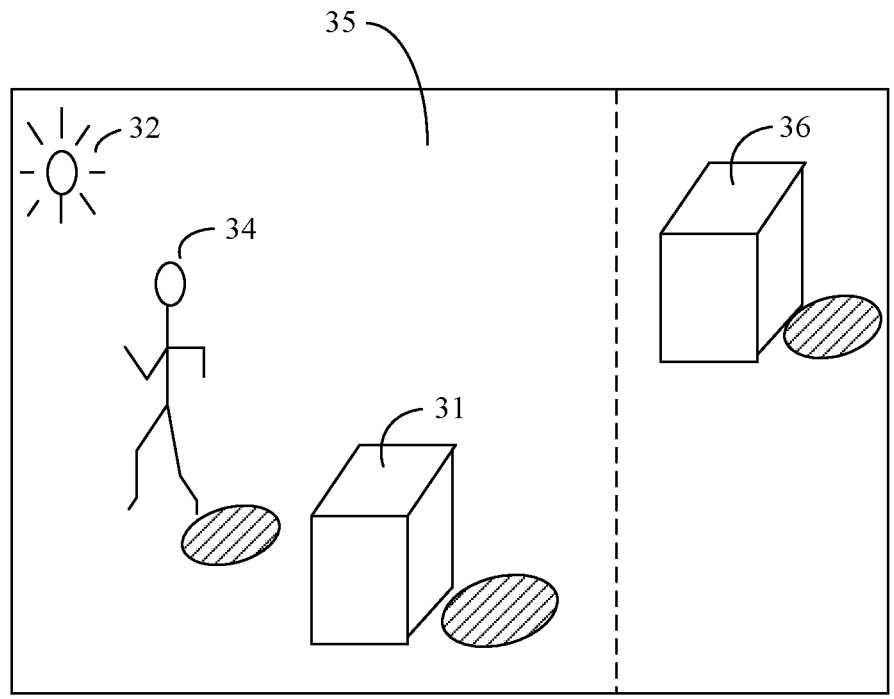
FIG. 3a and FIG. 3b are a schematic diagram of two frames of game pictures according to an embodiment of this application.
Figure 3B:
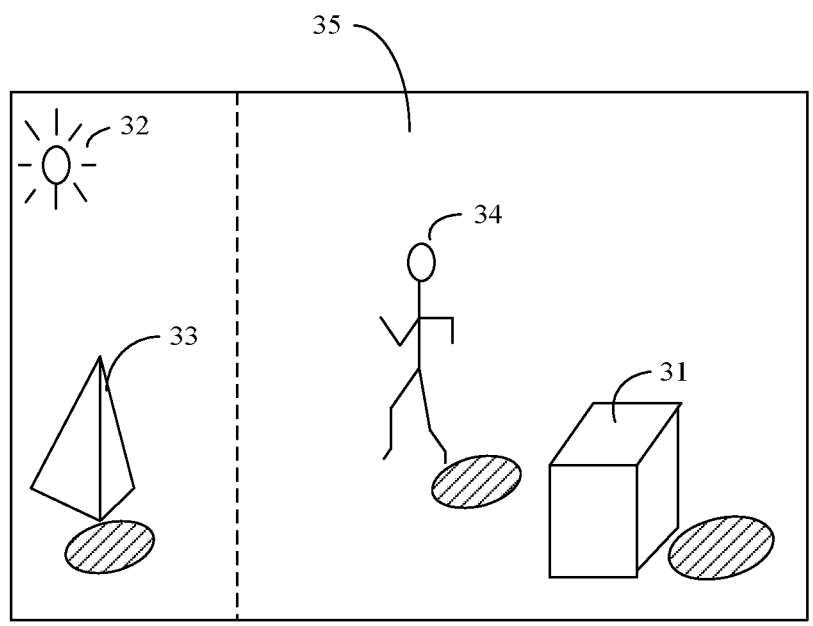

For example, it is assumed that FIG. 3a and FIG. 3b are a schematic diagram of two frames of game pictures according to an embodiment of this application. A game picture shown in FIG. 3b is a next frame of picture of a game picture shown in FIG. 3a. During rendering of the picture in FIG. 3b, corresponding objects in FIG. 3b and FIG. 3a are compared. For FIG. 3b and FIG. 3a, positions and statuses of a static object 31 and a light source 32 in virtual space do not change, and therefore rendering results of the static object 31 and the light source 32 in FIG. 3a may be reused. Due to movement of a moving object 34, a visual range in FIG. 3b changes with respect to that in FIG. 3a. A region in which a static object 36 is located is beyond the range of the picture. However, there is still a part of an overlapping region 35 between FIG. 3a and FIG. 3b. Therefore, a rendering result of the overlapping region 35 may be extracted from a rendering result in FIG. 3a to render an overlapping region in FIG. 3b. In comparison with FIG. 3a, an object 33 is a new object, and does not have a corresponding rendering result in FIG. 3a. Therefore, the object 33 and the moving object 34 need to be re-rendered together. When a specific rendering operation is performed, a rendering result, in FIG. 3a, corresponding to a part that does not change may be copied to a preset memory buffer (for example, a frame buffer, Framebuffer) for reuse, and on the basis of the reused rendering result, incremental rendering is performed on a part that changes, to obtain a rendering result of the picture in FIG. 3b.

A rendering effect of a part that is in the previous frame and that does not change with respect to the current frame is reused, so that repeated rendering of the part that does not change in a picture can be avoided, to reduce a picture rendering load, reduce processing resources occupied for picture rendering, improve stability of a rendering frame rate, enhance picture smoothness, and reduce energy consumption.

Figure 4:
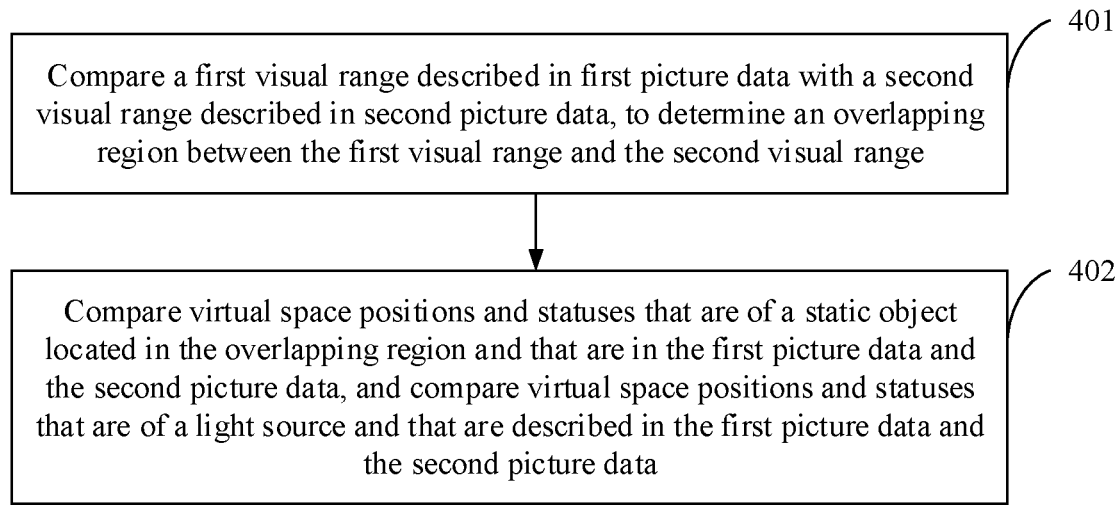
FIG. 4 is a flowchart of a method for comparing first picture data with second picture data according to an embodiment of this application.

FIG. 4 is a flowchart of a method for comparing the first picture data with the second picture data according to an embodiment of this application. As shown in FIG. 4, the method includes the following steps.

Step 401: Compare the first visual range described in the first picture data with the second visual range described in the second picture data, to determine an overlapping region between the first visual range and the second visual range.

Step 402: Compare virtual space positions and statuses that are of a static object located in the overlapping region and that are in the first picture data and the second picture data, and compare virtual space positions and statuses that are of the light source and that are described in the first picture data and the second picture data.

Figure 5A:
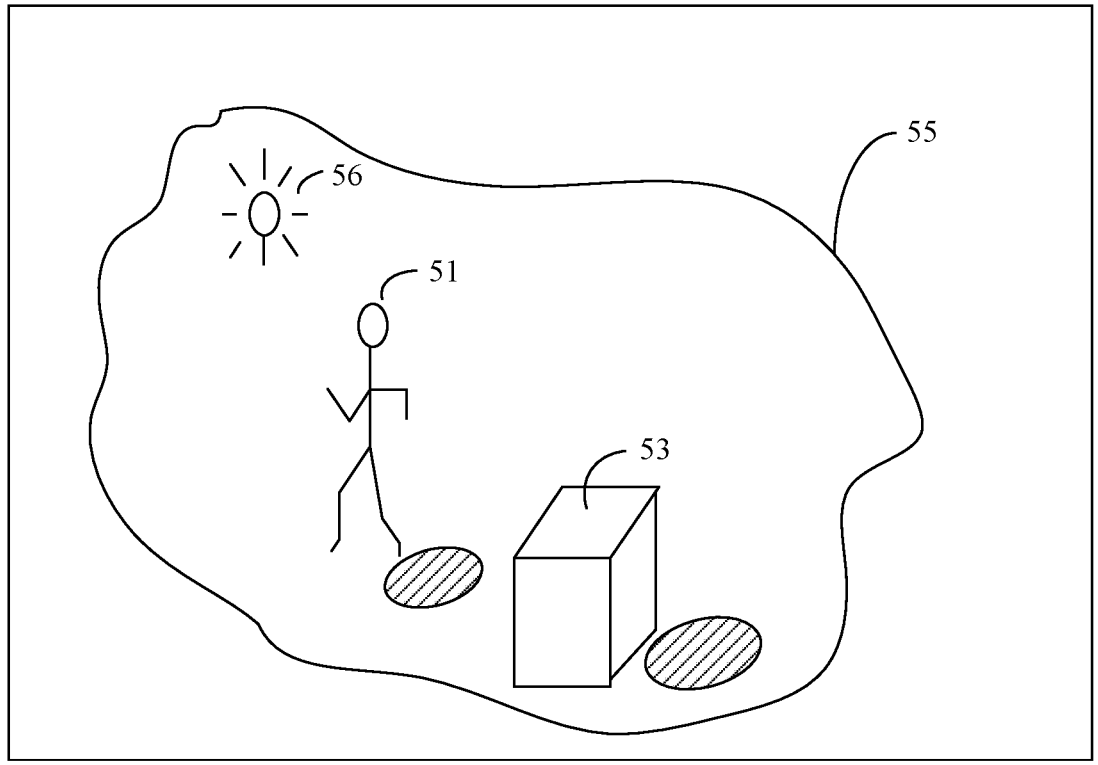
FIG. 5a and FIG. 5b are a schematic diagram of two frames of game pictures according to an embodiment of this application.
Figure 5B:
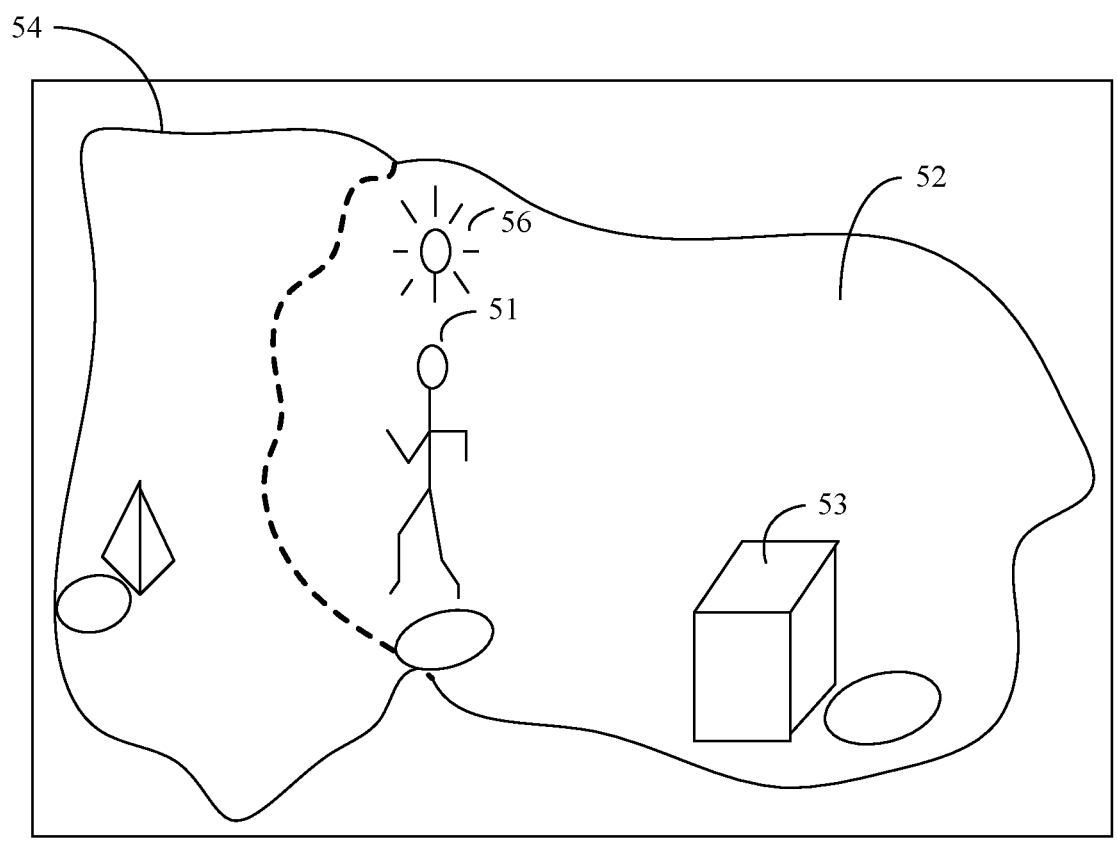

For example, FIG. 5a and FIG. 5b are a schematic diagram of two frames of game pictures according to an embodiment of this application. A game picture shown in FIG. 5b is a next frame of picture of a game picture shown in FIG. 5a. In FIG. 5b, a position of a moving object 51 in virtual space changes with respect to that in FIG. 5a, and a corresponding visual range 54 of the picture shown in FIG. 5b also changes with respect to that in FIG. 5a. In FIG. 5a, only for a region that overlaps that in FIG. 5b, there is a rendering result that can be reused. Therefore, in some implementations, to reduce a calculation amount of data comparison and improve rendering efficiency, an overlapping region 52 (for example, in this embodiment, the overlapping region 52 is a visual range 55 in FIG. 5a) between the visual range 55 in FIG. 5a and the visual range 54 in FIG. 5b may be first determined based on the visual range 55 and the visual range 54, and then a first data part corresponding to the overlapping region 52 is extracted from picture data of the picture shown in FIG. 5a, a second data part corresponding to the overlapping region 52 is extracted from picture data of the picture shown in FIG. 5b, and whether a virtual space position and a status of a static object 53 in the overlapping region 52 change is determined based on the first data part and the second data part. If either of the virtual space position and the status of the static object 53 changes, a rendering result of the static object 53 in FIG. 5a may be reused in FIG. 5b. In comparison with FIG. 5a, if the virtual space position and/or the status of the static object 53 in FIG. 5b change/changes, the static object 53 is re-rendered in FIG. 5b. For a visual range of a background in FIG. 5b, a background rendering result corresponding to the overlapping region 52 in FIG. 5a may be reused in FIG. 5b, and incremental rendering is performed on backgrounds in remaining visual ranges on this basis. For a light source 56 and a rendering effect of the light source 56, a position and a status of the light source in FIG. 5b are compared with a position and a status of the light source in FIG. 5a based on the picture data in FIG. 5a and FIG. 5b. If either of the position and the status of the light source 56 changes, a light effect rendering result of the overlapping region 52 in FIG. 5a is reused, and incremental rendering is performed on another region on this basis. A moving object in FIG. 5b is directly re-rendered, to obtain a rendering result.

The overlapping region between the first visual range of the current picture and the second visual range of the previous frame of picture is determined, and parts that are in the first picture data and the second picture data and that are used to describe the overlapping region are compared. Therefore, a case in which all of the first picture data is compared with all of the second picture data can be avoided while comparison accuracy is ensured. In this way, a calculation amount of data comparison is reduced, and data comparison efficiency is improved.

Figure 6:
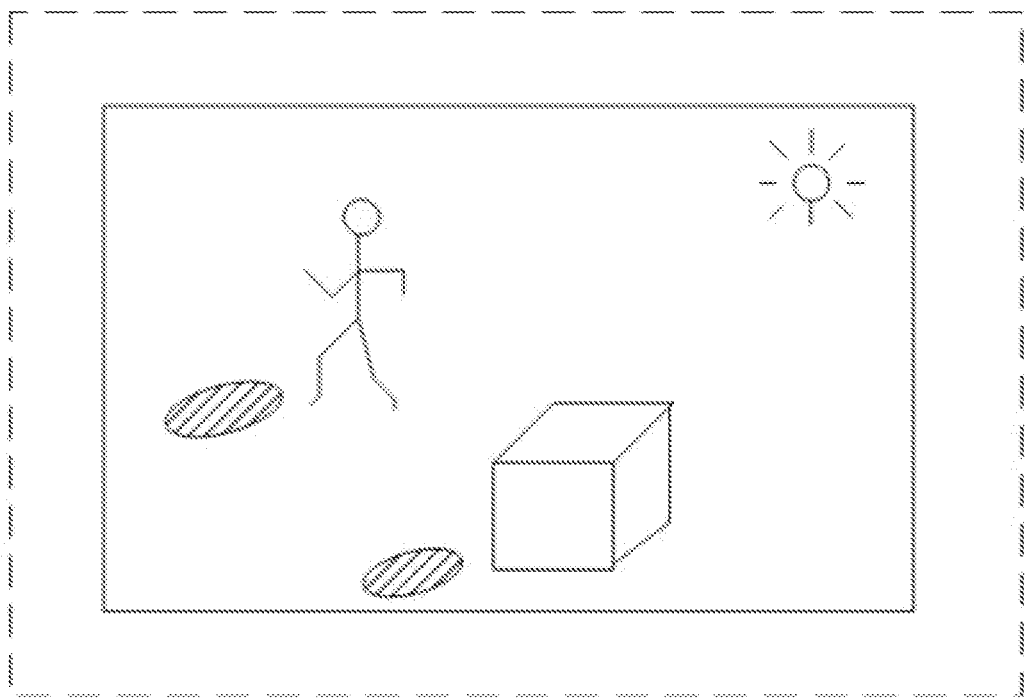
FIG. 6 is a schematic diagram of expanding a visual range of a picture according to an embodiment of this application.

In an embodiment of this application, when a picture rendering operation is performed, there may be further a step of expanding a visual range of a picture. In a feasible implementation, this step may be performed when the overlapping region between the first visual range of the current picture and the second visual range of the previous frame of picture is less than a preset range. For example, FIG. 6 is a schematic diagram of expanding a visual range of a picture according to an embodiment of this application. In FIG. 6, a rectangular region formed by a solid line is used as an example of the first visual range of the current picture, and a region between a dashed-line box and a solid-line box is an expanded visual range. When a range of the overlapping region between the first visual range of the current picture and the second visual range of the previous frame of picture is less than the preset range, to use the rendering effect of the current frame as much as possible in a rendering process of a next frame of picture of the current frame, a visual region of the current frame may be expanded on the basis of visual resolution M*N of a region in the rectangular solid-line box, so that there can be a relatively large overlapping region between the current frame and the next frame as much as possible. If an expansion amount in an M dimension is x and an expansion amount in an N dimension is y, (M+x)*(N+y) may represent a range of a region in the dashed-line box.

When the first visual range of the current picture is expanded, the expansion amount x in the M dimension and the expansion amount y in the N dimension may be set based on a preset policy. For example, in a manner, the expansion amounts x and y may be associated with a size of the first part that is in the current frame and that does not change with respect to the previous frame. A larger size of the first part indicates a larger quantity of rendering effects that can be reused in a rendering process of the current frame and a lighter rendering load. In this case, a relatively large value may be set for the expansion amounts x and y, so that there can be an as large as possible overlapping range between a visual range of the next frame of picture and the visual range of the current picture, to help reuse as many rendering effects as possible in the current frame. On the contrary, a smaller size of the first part indicates a smaller quantity of rendering results that can be reused in the rendering process of the current frame and a heavier rendering load. In this case, to avoid an increase in the rendering load, a relatively small value may be set for the expansion amounts x and y, and even 0 may be set. In other words, an expansion amount of the visual range of the current frame may be directly proportional to the size of the first part. In another manner, the expansion amounts x and y may be alternatively associated with a size of the second part that is in the current frame and that changes with respect to the previous frame. A smaller size of the second part indicates a lighter rendering load in the current frame. In this case, a relatively large value may be set for the expansion amounts x and y. On the contrary, a larger size of the second part indicates a heavier rendering load in the current frame. In this case, to avoid an increase in the load, a relatively small value may be set for the expansion amounts x and y, and even 0 may be set. In other words, an expansion amount of the visual range of the current frame may be inversely proportional to the size of the second part.

After the first visual range of the current frame is expanded, the first visual range described in the first picture data of the current frame may be updated to the expanded visual range, and the currently recorded second picture data of the previous frame may be updated to the first picture data of the current frame. In this way, during rendering of the next frame of the current frame, the visual range of the next frame of picture can be compared with the expanded visual range of the current frame, to obtain a relatively large overlapping region. Pictures presented in two adjacent frames are usually closest. Therefore, after the second picture data is updated to the first picture data, it can be implemented that for picture rendering of the next frame, a maximum quantity of effects can be obtained for reuse from the first picture data that is closest to the next frame in time. In this way, the rendering load is reduced, and rendering efficiency is improved.

The first visual range is expanded, so that it can be ensured that when a moving object in the picture moves in a small range, the visual range of the next frame of picture can be included in the expanded visual range of the current frame, or when a moving object moves in a relatively large range, there can be a relatively large overlapping region between the next frame of picture and the current frame of picture, to help use the rendering result of the current frame to a larger extent and reduce the rendering load.

Figure 7:
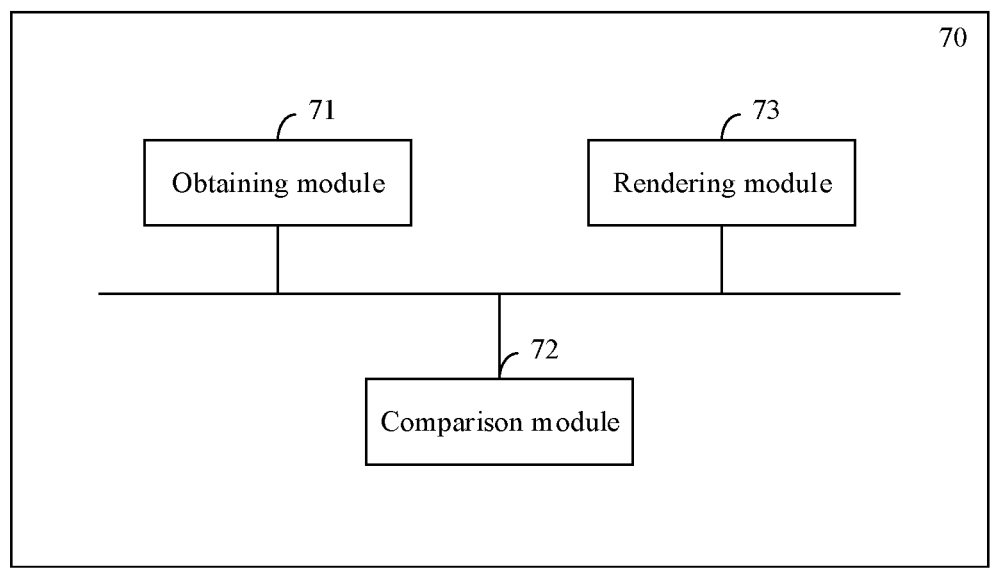
FIG. 7 is a schematic diagram of a structure of a picture processing apparatus according to an embodiment of this application.

FIG. 7 is a schematic diagram of a structure of a picture processing apparatus according to an embodiment of this application. As shown in FIG. 7, the picture processing apparatus 70 includes:
  an obtaining module 71, configured to obtain first picture data of a current frame;
  a comparison module 72, configured to compare the first picture data with currently recorded second picture data of a previous frame of the current frame, to determine a first part that is in the first picture data and that does not change with respect to the second picture data and a second part that is in the first picture data and that changes with respect to the second picture data; and
  a rendering module 73, configured to: reuse a rendering result corresponding to the first part in the previous frame, and render the second part in the current frame, to obtain and display a rendering result of the current frame.

The picture processing apparatus provided in this embodiment can perform the method in the embodiment in FIG. 2, and a manner of performing the method by the picture processing apparatus and beneficial effects are similar to those of the method. Details are not described herein.

Figure 8:
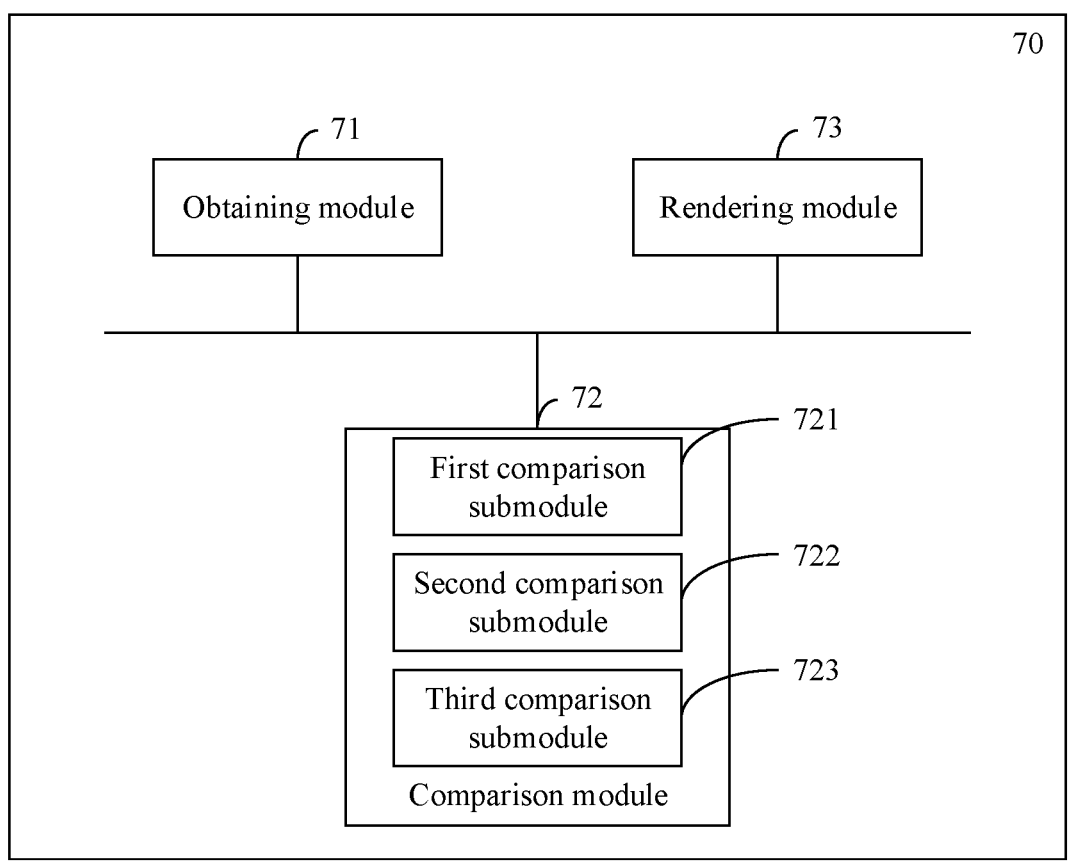
FIG. 8 is a schematic diagram of a structure of a picture processing apparatus according to an embodiment of this application.

FIG. 8 is a schematic diagram of a structure of a picture processing apparatus according to an embodiment of this application. In this embodiment, each of first picture data of a current frame and second picture data of a previous frame of the current frame includes a visual range of a picture background and virtual space positions and statuses of a static object and a light source. As shown in FIG. 8, on the basis of the foregoing embodiment, the comparison module 72 may include:
  a first comparison submodule 721, configured to compare a first visual range described in the first picture data with a second visual range described in the second picture data, to determine an overlapping region between the first visual range and the second visual range;
  a second comparison submodule 722, configured to compare virtual space positions and statuses that are of a static object located in the overlapping region and that are in the first picture data and the second picture data; and
  a third comparison submodule 723, configured to compare virtual space positions and statuses that are of the light source and that are described in the first picture data and the second picture data.

The picture processing apparatus provided in this embodiment can perform the method in the embodiment in FIG. 4, and a manner of performing the method by the picture processing apparatus and beneficial effects are similar to those of the method. Details are not described herein.

Figure 9:
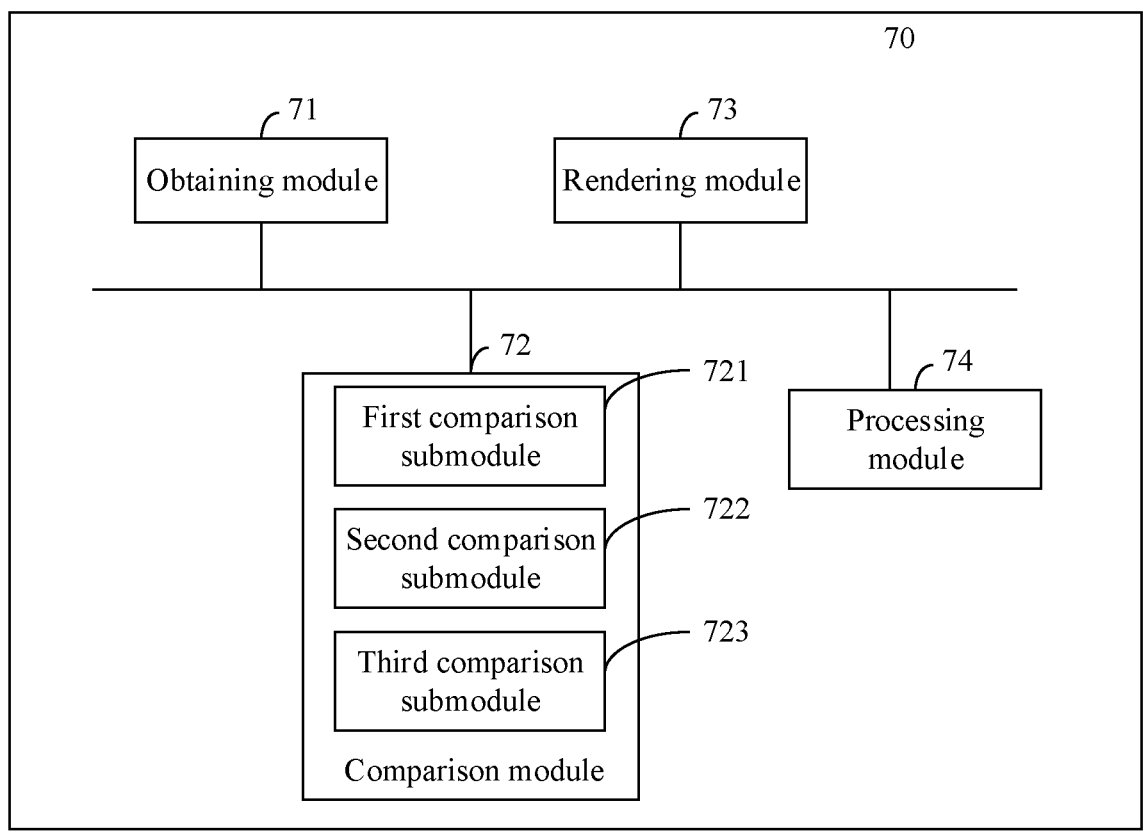
FIG. 9 is a schematic diagram of a structure of a picture processing apparatus according to an embodiment of this application.

FIG. 9 is a schematic diagram of a structure of a picture processing apparatus according to an embodiment of this application. As shown in FIG. 9, on the basis of the foregoing embodiment, the picture processing apparatus 70 may further include:
  a processing module 74, configured to: when a range of the overlapping region is less than a preset range, expand a visual range of the current frame on the basis of the first visual range, and render a part obtained after expansion.

In an implementation, an expansion amount of the visual range of the current frame is directly proportional to a size of the first part that does not change.

In an implementation, an expansion amount of the visual range of the current frame is inversely proportional to a size of the second part that changes.

In an implementation, the apparatus further includes:
  a first updating module, configured to update the second visual range described in the second picture data to an expanded visual range of the current frame.

In an implementation, the apparatus further includes:
  a second updating module, configured to update the currently recorded second picture data of the previous frame to the first picture data of the current frame.

The apparatus provided in this embodiment can execute the technical solution in the embodiment in FIG. 6, and a manner of executing the technical solution by the apparatus and beneficial effects are similar to those of the technical solution. Details are not described herein.

An embodiment of this application further provides a computer-readable storage medium. The computer-readable storage medium stores a computer program. When the computer program is run on a computer, the computer is enabled to perform the picture rendering method in the foregoing embodiments.

In addition, an embodiment of this application further provides a computer program product. The computer program product includes a computer program. When the computer program is run on a computer, the computer is enabled to perform the picture rendering method in the foregoing embodiments.

In addition, an embodiment of this application further provides a processor. The processor includes at least one circuit, configured to perform the picture rendering method in the foregoing embodiments.

An embodiment of this application further provides an electronic device. The electronic device may be configured to implement the picture rendering method described in the foregoing method embodiments.

For example, the electronic device may include one or more processors and interfaces. The interface is coupled to the processor. The processor may also be referred to as a processing unit, and may implement a specific control function. The processor may be a general-purpose processor, a dedicated processor, or the like.

In a feasible design, the processor may further store instructions, and the instructions may be executed by the processor, so that the electronic device performs the picture rendering method described in the foregoing method embodiments.

In still another possible design, the electronic device may include a circuit, and the circuit may implement a part of obtaining picture data and displaying a rendering result in the foregoing method embodiments.

In a design, the electronic device may include one or more memories. The memory stores instructions or intermediate data. The instructions may be run on the processor, so that the electronic device performs the method described in the foregoing method embodiments. In some embodiments, the memory may further store other related data. The processor and the memory may be separately disposed, or may be integrated together.

In a design, the electronic device may further include a transceiver.

The processor may be referred to as a processing unit. The transceiver may be referred to as a transceiver unit, a transceiver machine, a transceiver circuit, a transceiver, or the like, and is configured to implement a transceiver function of the electronic device.

The processor and the transceiver in this application may be implemented in an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may also be manufactured by using various 1C process technologies, for example, a complementary metal-oxide-semiconductor (complementary metal-oxide-semiconductor, CMOS), an n-type metal oxide semiconductor (n-type metal oxide semiconductor, NMOS), a p-channel metal oxide semiconductor (p-channel metal oxide semiconductor, PMOS), a bipolar junction transistor (Bipolar Junction Transistor, BJT), a bipolar CMOS (BiCMOS), silicon germanium (SiGe), gallium arsenide (GaAs), and the like.

Figure 10:
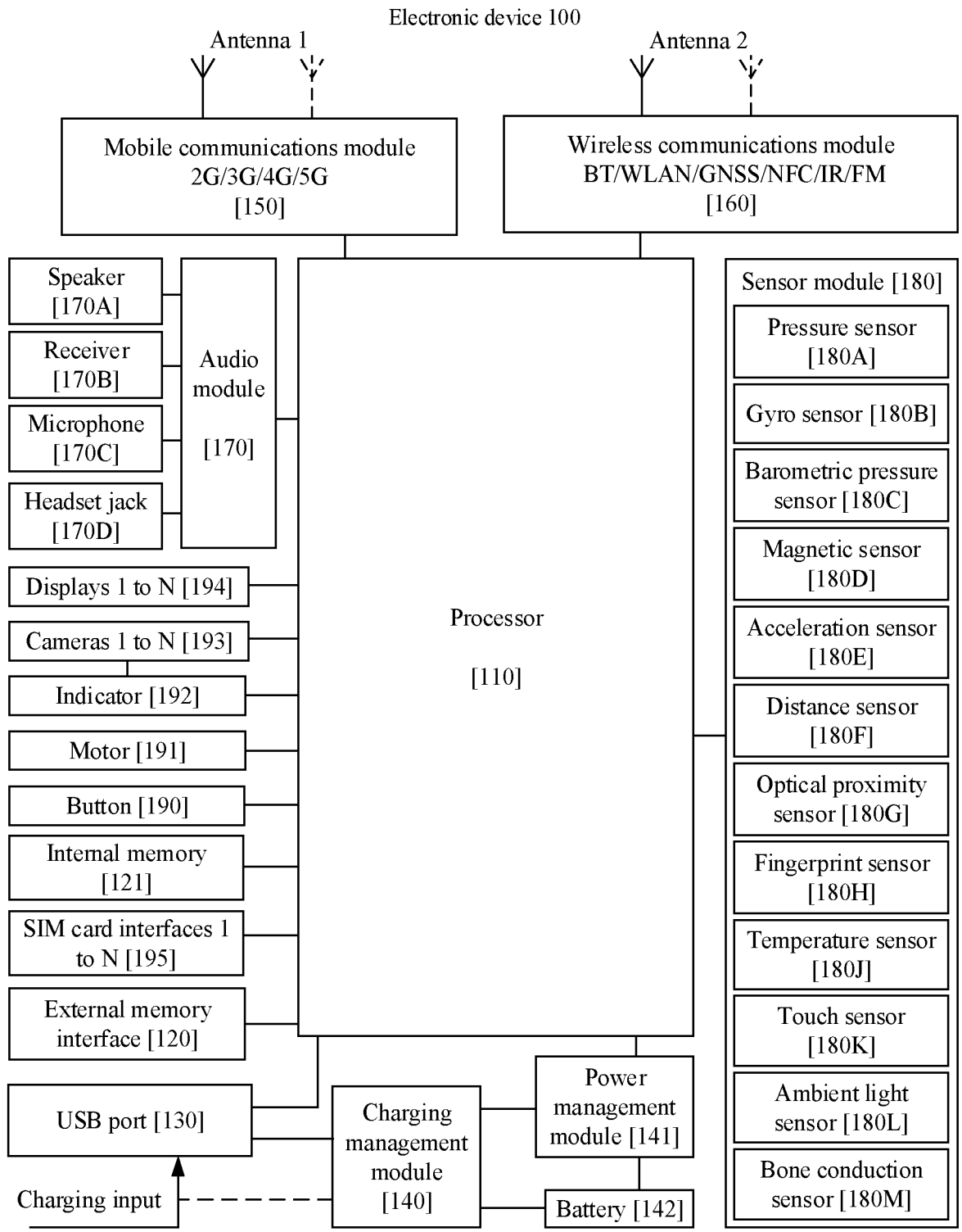
FIG. 10 is a schematic diagram of a structure of an electronic device according to an embodiment of this application.

For example, FIG. 10 is a schematic diagram of a structure of an electronic device according to an embodiment of this application. For example, the electronic device may be understood as a mobile terminal. The electronic device may be configured to perform the foregoing picture rendering method. As shown in FIG. 10, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identification module (subscriber identification module, SIM) card interface 195, and the like. It may be understood that a structure shown in embodiments does not constitute a specific limitation on the electronic device 100. In some other embodiments of this application, the electronic device 100 may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 100 may alternatively include one or more processors 110. The controller may be a nerve center and a command center of the electronic device 100. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, so that system efficiency of the electronic device 100 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like. The USB port 130 is a port that conforms to a USB standard specification, and may be specifically a mini USB port, a micro USB port, a USB Type-C port, or the like. The USB port 130 may be configured to connect to the charger to charge the electronic device 100, or may be configured to transmit data between the electronic device 100 and a peripheral device, or may be configured to connect to a headset to play audio by using the headset.

It may be understood that an interface connection relationship between the modules that is shown in embodiments of the present invention is merely an example for description, and does not constitute a limitation on the structure of the electronic device 100. In other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 100. The charging management module 140 supplies power to the electronic device 100 through the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like. The antenna 1 and the antenna 2 are configured to: transmit and receive electromagnetic wave signals. Each antenna in the electronic device 100 may be configured to cover one or more communication bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier, and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN), Bluetooth, a global navigation satellite system (global navigation satellite system, GNSS), frequency modulation (frequency modulation, FM), NFC, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a GSM, a GPRS, CDMA, WCDMA, TD-SCDMA, LTE, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a photographing function by using the ISP, one or more cameras 193, the video codec, the GPU, one or more displays 194, the application processor, and the like.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, data files such as music, a photo, and a video are stored in the external storage card.

The internal memory 121 may be configured to store one or more computer programs, and the one or more computer programs include instructions. The processor 110 may run the instructions stored in the internal memory 121, so that the electronic device 100 performs the voice switching method provided in some embodiments of this application, various function applications, data processing, and the like. The internal memory 121 may include a program storage area and a data storage area. The program storage area may store an operating system. The program storage area may further store one or more applications (for example, Gallery and Contacts), and the like. The data storage area may store data (such as photos and contacts) created during use of the electronic device 100, and the like. In addition, the internal memory 121 may include a high-speed random access memory, and may further include a nonvolatile memory, for example, at least one magnetic disk storage device, a flash storage device, or a universal flash storage (universal flash storage, UFS). In some embodiments, the processor 110 may run the instructions stored in the internal memory 121 and/or the instructions stored in the memory disposed in the processor 110, to enable the electronic device 100 to perform the picture rendering method provided in embodiments of this application, various functional applications, and data processing.

The electronic device 100 may implement audio functions, for example, music playing and recording, by using the audio module 170, the speaker 170A, the receiver 170B, the microphone 170C, the headset jack 170D, the application processor, and the like. The audio module 170 is configured to convert digital audio information into analog audio signal output, and is also configured to convert analog audio input into a digital audio signal. The audio module 170 may be further configured to: code and decode an audio signal. In some embodiments, the audio module 170 may be disposed in the processor 110, or some functional modules of the audio module 170 are disposed in the processor 110. The speaker 170A, also referred to as a "horn", is configured to convert an audio electrical signal into a sound signal. The electronic device 100 may be used to listen to music or answer a call in a hands-free mode over the speaker 170A. The receiver 170B, also referred to as an "earpiece", is configured to convert an audio electrical signal into a sound signal. When a call is answered or voice information is listened to by using the electronic device 100, the receiver 170B may be put close to a human ear to listen to a voice. The microphone 170C, also referred to as a "mike" or a "mic", is configured to convert a sound signal into an electrical signal. When making a call or sending voice information, the user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like. The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the electronic device 100. In some embodiments, an angular velocity of the electronic device 100 around three axes (that is, axes X, Y, and Z) may be determined by using the gyro sensor 180B. The gyro sensor 180B may be configured to perform image stabilization during photographing. For example, when a shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario, a motion-sensing game scenario, and the like.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H (also referred to as a fingerprint recognizer) is configured to collect a fingerprint. The electronic device 100 may use a feature of the collected fingerprint to implement fingerprint-based unlocking, application lock access, fingerprint-based photographing, fingerprint-based call answering, and the like. In addition, for other descriptions of fingerprint sensors, refer to International Patent Application PCT/CN2017/082773 and entitled "NOTIFICATION PROCESSING METHOD AND ELECTRONIC DEVICE", which is incorporated herein by reference in its entirety.

The touch sensor 180K may also be referred to as a touch panel or a touch-sensitive surface. The touch sensor 180K may be disposed on the display 194, and a touchscreen includes the touch sensor 180K and the display 194. The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A person skilled in the art can appreciate that technologies in this application may be implemented in various apparatuses or devices, including a wireless handset, an integrated circuit (IC), or a group of ICs (for example, a chipset). Various components, modules, or units are described in this application to emphasize function aspects of the apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including one or more processors described above).

The foregoing descriptions are merely specific example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A picture rendering method comprising:
   obtaining first picture data of a current frame;
   comparing the first picture data with currently recorded second picture data of a previous frame of the current frame to determine a first part in the first picture data that does not change with respect to the second picture data and a second part in the first picture data that changes with respect to the second picture data, wherein the comparing comprises:
      comparing a first visual range described in the first picture data with a second visual range described in the second picture data to determine an overlapping region between the first visual range and the second visual range;
      comparing first virtual space positions and first statuses that are of a first static object located in the overlapping region and that are in the first picture data and the second picture data; and comparing second virtual space positions and second statuses that are of a light source and that are described in the first picture data and the second picture data, wherein each of the first picture data and the second picture data comprises a third visual range of a picture background and third virtual space positions and third statuses of a second static object and the light source;

rendering, by reusing a first rendering result corresponding to the first part in the previous frame, the second part in the current frame to obtain a second rendering result of the current frame; and expanding, when a range of the overlapping region is less than a preset range: a fourth visual range of the current frame on the basis of the first visual range to obtain a third part; and rendering the third part.

2. The method of claim 1, wherein an expansion amount of the fourth visual range is directly proportional to a size of the first part.

3. The method of claim 2, further comprising updating the currently recorded second picture data to the first picture data.

4. The method of claim 1, wherein an expansion amount of the fourth visual range is inversely proportional to a size of the second part.

5. The method of claim 4, further comprising updating the currently recorded second picture data to the first picture data.

6. The method of claim 1, further comprising updating the first visual range to an expanded visual range of the current frame.

7. The method of claim 1, further comprising updating the currently recorded second picture data to the first picture data.

8. An electronic device comprising:
a processor; and
a memory coupled to the processor and configured to store instructions, wherein when executed by the processor, the instructions cause the electronic device to:
obtain first picture data of a current frame;
compare the first picture data with currently recorded second picture data of a previous frame of the current frame to determine a first part in the first picture data that does not change with respect to the second picture data and a second part in the first picture data that changes with respect to the second picture data, wherein the comparing comprises:
comparing a first visual range described in the first picture data with a second visual range described in the second picture data to determine an overlapping region between the first visual range and the second visual range;
comparing first virtual space positions and first statuses that are of a first static object located in the overlapping region and that are in the first picture data and the second picture data; and
comparing second virtual space positions and second statuses that are of a light source and that are described in the first picture data and the second picture data,
wherein each of the first picture data and the second picture data comprises a third visual range of a picture background and third virtual space positions and third statuses of a second static object and the light source;

render, by reusing a first rendering result corresponding to the first part in the previous frame, the second part in the current frame to obtain a second rendering result of the current frame;

when a range of the overlapping region is less than a preset range: expand a fourth visual range of the current frame based on the first visual range, to obtain a third part; and render the third part.

9. The electronic device of claim 8, wherein an expansion amount of the fourth visual range is directly proportional to a size of the first part.

10. The electronic device of claim 9, wherein when executed by the processor, the instructions further cause the electronic device to update the currently recorded second picture data to the first picture data.

11. The electronic device of claim 8, wherein an expansion amount of the fourth visual range is inversely proportional to a size of the second part.

12. The electronic device of claim 11, wherein when executed by the processor, the instructions further cause the electronic device to update the currently recorded second picture data to the first picture data.

13. The electronic device of claim 8, wherein when executed by the processor, the instructions further cause the electronic device to update the first visual range to an expanded visual range of the current frame.

14. The electronic device of claim 8, wherein when executed by the processor, the instructions further cause the electronic device to update the currently recorded second picture data to the first picture data.

15. A computer program product comprising computer-executable instructions that are stored on a non-transitory machine-readable storage medium and that, when executed by a processor, cause an apparatus to:
obtain first picture data of a current frame;
compare the first picture data with currently recorded second picture data of a previous frame of the current frame to determine a first part in the first picture data that does not change with respect to the second picture data and a second part in the first picture data that changes with respect to the second picture data, wherein the computer-executable instructions further cause the apparatus to compare the first picture data with the currently recorded second picture data by:
comparing a first visual range described in the first picture data with a second visual range described in the second picture data to determine an overlapping region between the first visual range and the second visual range;
comparing first virtual space positions and first statuses that are of a first static object located in the overlapping region and that are in the first picture data and the second picture data; and
comparing second virtual space positions and second statuses that are of a light source and that are described in the first picture data and the second picture data,
wherein each of the first picture data and the second picture data comprises a third visual range of a picture background and third virtual space positions and third statuses of a second static object and the light source;
render, by reusing a first rendering result corresponding to the first part in the previous frame, the second part in the current frame to obtain a second rendering result of the current frame; and when a range of the overlapping region is less than a preset range: expand a fourth visual range of the current frame on the basis of the first visual range to obtain a third part; and render the third part.

16. The computer program product of claim 15, wherein an expansion amount of the fourth visual range is directly proportional to a size of the first part.

17. The computer program product of claim 16, wherein the computer-executable instructions further cause the apparatus to update the currently recorded second picture data to the first picture data.

18. The computer program product of claim 15, wherein an expansion amount of the fourth visual range is inversely proportional to a size of the second part.

19. The computer program product of claim 15, wherein the computer-executable instructions further cause the apparatus to update the first visual range to an expanded visual range of the current frame.

20. The computer program product of claim 15, wherein the computer-executable instructions further cause the apparatus to update the currently recorded second picture data to the first picture data.

* * * * *